(12) United States Patent
Messina et al.

(10) Patent No.: US 8,107,808 B2
(45) Date of Patent: *Jan. 31, 2012

(54) COMBINATION DARK FIELD AND BRIGHT FIELD ILLUMINATOR

(75) Inventors: Michael C. Messina, Hooksett, NH (US); Thomas J. Driscoll, Mount Vernon, NH (US); Kyle M. O'Brien, Chelmsford, MA (US)

(73) Assignee: Microscan Systems, Inc., Renton, WA (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/501,325

(22) Filed: Jul. 10, 2009

(65) Prior Publication Data
US 2011/0008035 A1    Jan. 13, 2011

(51) Int. Cl.
G03B 15/06 (2006.01)
G03B 15/02 (2006.01)

(52) U.S. Cl. ............... 396/199; 362/3; 362/11

(58) Field of Classification Search ........... 396/3, 11; 362/199, 200
See application file for complete search history.

(56) References Cited

U.S. PATENT DOCUMENTS

| | | | |
|---|---|---|---|
| 2,357,378 A | 9/1944 | Benford | |
| 3,614,449 A | 10/1971 | Ward, III | |
| 3,726,998 A | 4/1973 | Szpak et al. | |
| 3,857,626 A | 12/1974 | Rosenberger et al. | |
| 3,918,028 A | 11/1975 | Humphrey et al. | |
| 4,099,221 A | 7/1978 | Carrillo | |
| 4,128,298 A | 12/1978 | McMillan | |
| 4,232,219 A | 11/1980 | Yamamoto et al. | |
| 4,298,262 A | 11/1981 | Nozawa et al. | |
| 4,475,796 A | 10/1984 | Kimura | |
| 4,594,645 A | 6/1986 | Terashita | |
| 4,626,079 A | 12/1986 | Nakamura et al. | |
| 4,653,875 A | 3/1987 | Hines | |
| 4,767,172 A | 8/1988 | Nichols et al. | |
| 4,768,133 A | 8/1988 | Simons et al. | |
| 4,930,872 A | 6/1990 | Convery | |
| 4,969,037 A | 11/1990 | Poleschinski et al. | |

(Continued)

FOREIGN PATENT DOCUMENTS

DE    31 00 662 A1    11/1981

(Continued)

OTHER PUBLICATIONS

Wolfson, Richard and Pasachoff, Jay M., "Physics with Modern Physics for Scientists and Engineers", Second Edition, Chapter 35, pp. 900-901, 1995.

(Continued)

*Primary Examiner* — Clayton E Laballe
*Assistant Examiner* — Noam Reisner
(74) *Attorney, Agent, or Firm* — Blakely Sokoloff Taylor & Zafman LLP

(57) ABSTRACT

Embodiments are disclosed of an apparatus including a curved reflector having an interior and an open end; a light module positioned around a perimeter of the open end of the reflector, the light module including a first side having one or more interior light sources thereon to direct light toward the interior of the reflector and a second side having one or more exterior light sources thereon to direct light away from the reflector; and a light pipe coupled to the light module and aligned so that light from the one or more exterior light sources is launched into the light pipe. Other embodiments are also disclosed and claimed.

32 Claims, 13 Drawing Sheets

U.S. PATENT DOCUMENTS

| | | |
|---|---|---|
| 5,149,948 A | 9/1992 | Chisholm |
| 5,161,874 A | 11/1992 | Benes |
| 5,172,005 A | 12/1992 | Cochran et al. |
| 5,177,346 A | 1/1993 | Chisholm |
| 5,191,199 A | 3/1993 | Elko |
| 5,227,642 A | 7/1993 | Shimizu |
| 5,274,228 A | 12/1993 | Kaplan |
| 5,331,176 A | 7/1994 | Sant' Anselmo et al. |
| 5,332,892 A | 7/1994 | Li et al. |
| 5,349,172 A | 9/1994 | Roustaei |
| 5,349,210 A | 9/1994 | Ackley et al. |
| 5,354,977 A | 10/1994 | Roustaei |
| 5,362,953 A | 11/1994 | McKenna et al. |
| 5,378,883 A | 1/1995 | Batterman et al. |
| 5,399,852 A | 3/1995 | Zheng et al. |
| 5,406,060 A | 4/1995 | Gitin |
| 5,408,084 A | 4/1995 | Brandorff et al. |
| 5,461,417 A | 10/1995 | White et al. |
| 5,481,101 A | 1/1996 | Yoshida |
| 5,497,267 A | 3/1996 | Ishikawa et al. |
| 5,506,663 A | 4/1996 | Ulrich et al. |
| 5,506,929 A | 4/1996 | Tai et al. |
| 5,508,504 A | 4/1996 | Dvorkis et al. |
| 5,515,452 A | 5/1996 | Penkethman et al. |
| 5,517,018 A | 5/1996 | Zheng et al. |
| 5,532,467 A | 7/1996 | Roustaei |
| 5,539,485 A | 7/1996 | White |
| 5,550,362 A | 8/1996 | Sherman |
| 5,567,934 A | 10/1996 | Zheng et al. |
| 5,569,902 A | 10/1996 | Wood et al. |
| 5,572,006 A | 11/1996 | Wang et al. |
| 5,574,804 A | 11/1996 | Olschafskie et al. |
| 5,584,558 A | 12/1996 | Nath |
| 5,586,212 A | 12/1996 | McConica et al. |
| 5,604,550 A | 2/1997 | White |
| 5,619,029 A | 4/1997 | Roxby et al. |
| 5,656,803 A | 8/1997 | Seo |
| 5,684,530 A | 11/1997 | White |
| 5,690,417 A | 11/1997 | Polidor et al. |
| 5,697,699 A | 12/1997 | Seo et al. |
| 5,761,540 A | 6/1998 | White |
| 5,786,586 A | 7/1998 | Pidhirny et al. |
| 5,844,228 A | 12/1998 | Nukui et al. |
| 5,859,418 A | 1/1999 | Li et al. |
| 5,903,394 A | 5/1999 | Sipotz, Jr. |
| 5,907,148 A | 5/1999 | Iwafuchi et al. |
| 5,923,022 A | 7/1999 | Penn et al. |
| 5,945,661 A | 8/1999 | Nukui et al. |
| 5,959,283 A | 9/1999 | Tawara et al. |
| 5,992,746 A | 11/1999 | Suzuki |
| 5,999,751 A | 12/1999 | Imamura et al. |
| 6,006,990 A | 12/1999 | Ye et al. |
| 6,022,124 A | 2/2000 | Bourn et al. |
| 6,033,090 A | 3/2000 | Seo |
| 6,052,534 A | 4/2000 | Goto |
| 6,181,471 B1 | 1/2001 | Miyoshi |
| 6,247,645 B1 | 6/2001 | Harris et al. |
| 6,324,024 B1 | 11/2001 | Shirai et al. |
| 6,352,204 B2 | 3/2002 | Hattersley et al. |
| 6,552,783 B1 | 4/2003 | Schmidt et al. |
| 7,198,384 B2 | 4/2007 | Kakiuchi et al. |
| 7,386,227 B1 | 6/2008 | Henderson |
| 7,783,178 B2 | 8/2010 | Liu |
| 7,822,335 B1 | 10/2010 | Pastore |
| 7,877,003 B2 | 1/2011 | Dunn et al. |
| 2001/0026320 A1 | 10/2001 | Seo |
| 2004/0001344 A1 | 1/2004 | Hecht |
| 2004/0125215 A1 | 7/2004 | Wallace |
| 2005/0030960 A1 | 2/2005 | Sumida et al. |
| 2005/0237423 A1 | 10/2005 | Nilson et al. |
| 2006/0039692 A1 | 2/2006 | Lee et al. |
| 2006/0175409 A1 | 8/2006 | Reichenbach et al. |
| 2006/0209417 A1 | 9/2006 | Kojima |
| 2008/0106794 A1 | 5/2008 | Messina |
| 2008/0137323 A1* | 6/2008 | Pastore .......................... 362/11 |
| 2008/0137324 A1 | 6/2008 | Pastore |
| 2008/0137325 A1 | 6/2008 | Pastore |
| 2008/0158854 A1 | 7/2008 | Matsui |
| 2008/0170380 A1 | 7/2008 | Pastore |
| 2011/0002682 A1 | 1/2011 | Messina |

FOREIGN PATENT DOCUMENTS

| | | |
|---|---|---|
| DE | 10146158 A1 | 4/2003 |
| EP | 0 185 782 A1 | 7/1986 |
| EP | 1 455 179 A1 | 9/2004 |
| JP | 58028712 A | 2/1983 |
| JP | 61270720 A | 12/1986 |
| JP | 2001034702 A | 2/2001 |
| WO | WO 99/22224 | 5/1999 |
| WO | WO 99/40361 A1 | 8/1999 |
| WO | WO 99/49347 | 9/1999 |
| WO | WO 02/075637 A1 | 9/2002 |
| WO | WO 2005/043449 A1 | 5/2005 |
| WO | WO 2008/036414 A2 | 3/2008 |
| WO | WO 2008/039541 A2 | 4/2008 |

OTHER PUBLICATIONS

International Search Report and Written Opinion, International Application No. PCT/US2007/020539, mail date Jul. 1, 2008.

International Preliminary Report on Patentability, International Application No. PCT/US2007/020539, mail date Nov. 3, 2008.

AIM, "Direct Part Mark (DPM) Quality Guideline", AIM Inc., Dec. 12, 2006 (20 pages).

PCT/US2010/039536, International Search Report and Written Opinion of the International Searching Authority, mail date Feb. 1, 2011 (8 pages).

PCT/US2010/039550, International Search Report and Written Opinion of the International Searching Authority, mail date Feb. 1, 2011 (7 pages).

* cited by examiner

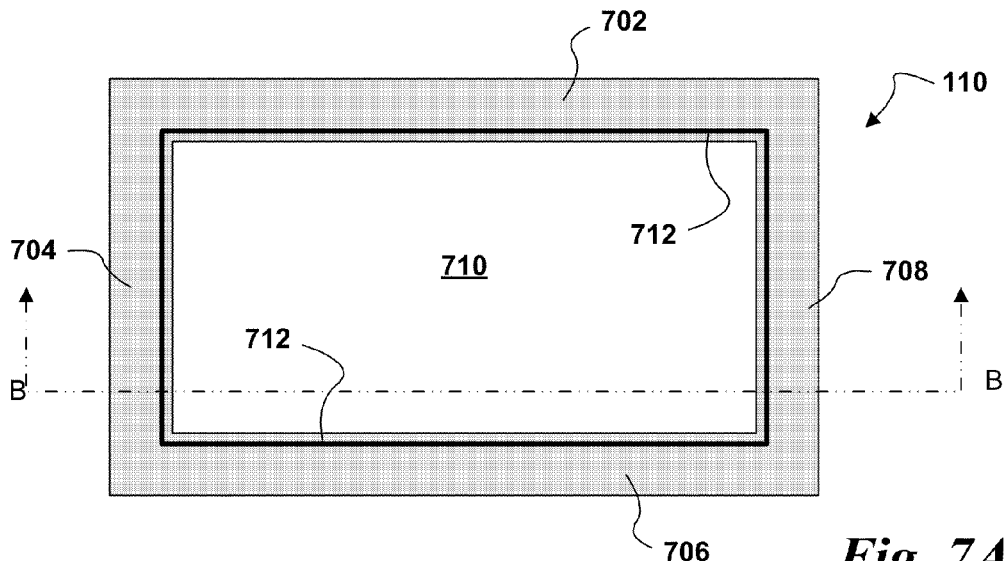
*Fig. 7A*
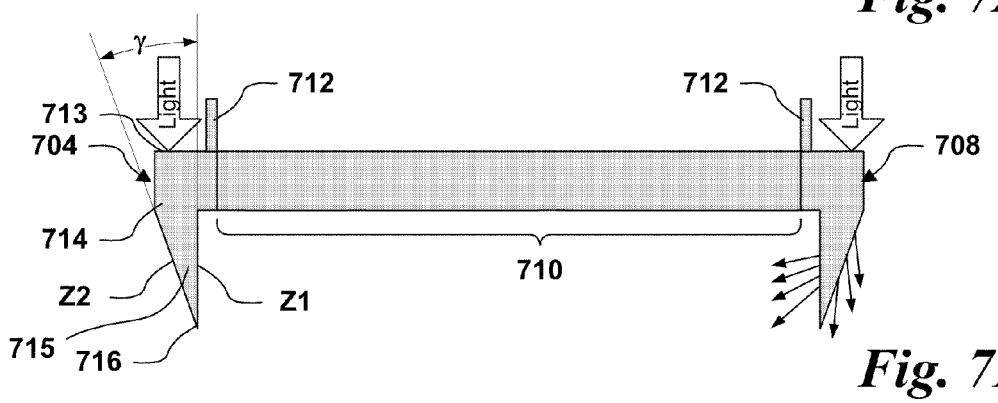
*Fig. 7B*
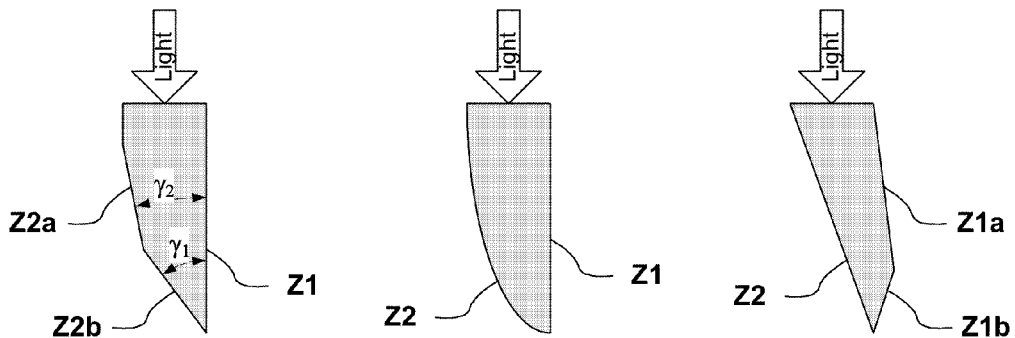
*Fig. 7C*  *Fig. 7D*  *Fig. 7E*

COMBINATION DARK FIELD AND BRIGHT FIELD ILLUMINATOR

CROSS-REFERENCE TO RELATED APPLICATIONS

This application is related to U.S. patent application Ser. No. 12/497,265, entitled DIFFUSE REFLECTIVE ILLUMINATOR, filed 2 Jul. 2009.

TECHNICAL FIELD

The present invention relates generally to illumination systems and in particular, but not exclusively, to an illuminator including co-axial dark field and bright field illuminators.

BACKGROUND

Optical data-reading systems have become an important and ubiquitous tool in tracking many different types of items and machine-vision systems have become an important tool for tasks such as part identification and inspection. Both optical data-reading systems and machine vision systems capture a two-dimensional digital image of the optical symbol (in the case of an optical data-reading system) or the part (in the case of a general machine-vision system) and then proceed to analyze that image to extract the information contained in the image. One difficulty that has emerged in machine vision systems is that of ensuring that the camera acquires an accurate image of the object; if the camera cannot capture an accurate image of the object, the camera can be unable to decode or analyze the image, or can have difficulty doing so.

One of the difficulties in acquiring an accurate image is ensuring that the object being imaged is properly illuminated. Problems can arise when a system is used to image a variety of different symbols, because for a given system the lighting may or may not be of the right type. A system with a bright field illumination will therefore find it difficult or impossible to image an object that requires dark-field illumination, while a system with a dark field illumination will therefore find it difficult or impossible to image an object that requires bright field illumination. Illuminators used with existing optical data-reading systems and machine vision systems tend to be capable of bright field illumination or dark field illumination, but not both. Users must therefore keep two separate systems on hand so that they will have one with the correct kind of lighting.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 7A is a plan view of an embodiment of a light pipe assembly.

FIG. 7B is a sectional view of the light pipe assembly shown in FIG. 7A, taken substantially along section line B-B.

FIGS. 7C-7E are sectional views of alternative embodiments of a light pipe.

DETAILED DESCRIPTION OF THE ILLUSTRATED EMBODIMENTS

Embodiments of an apparatus, system and method for an illuminator including co-axial dark field and bright field illuminators are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
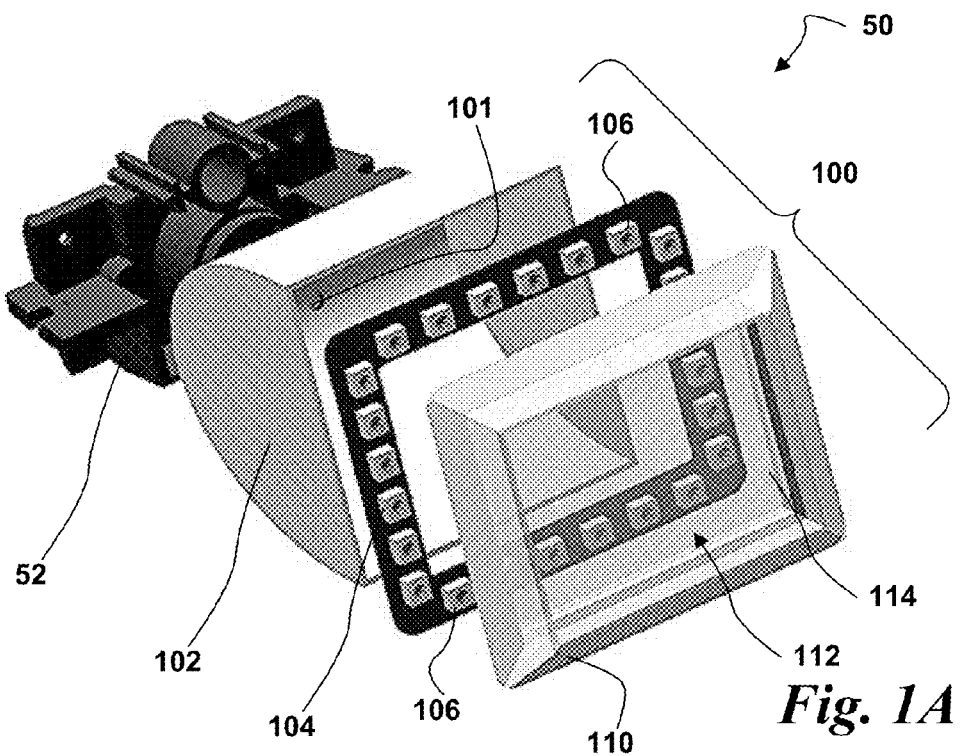
FIG. 1A is an exploded front perspective view of an embodiment of an illuminator.
Figure 1B:
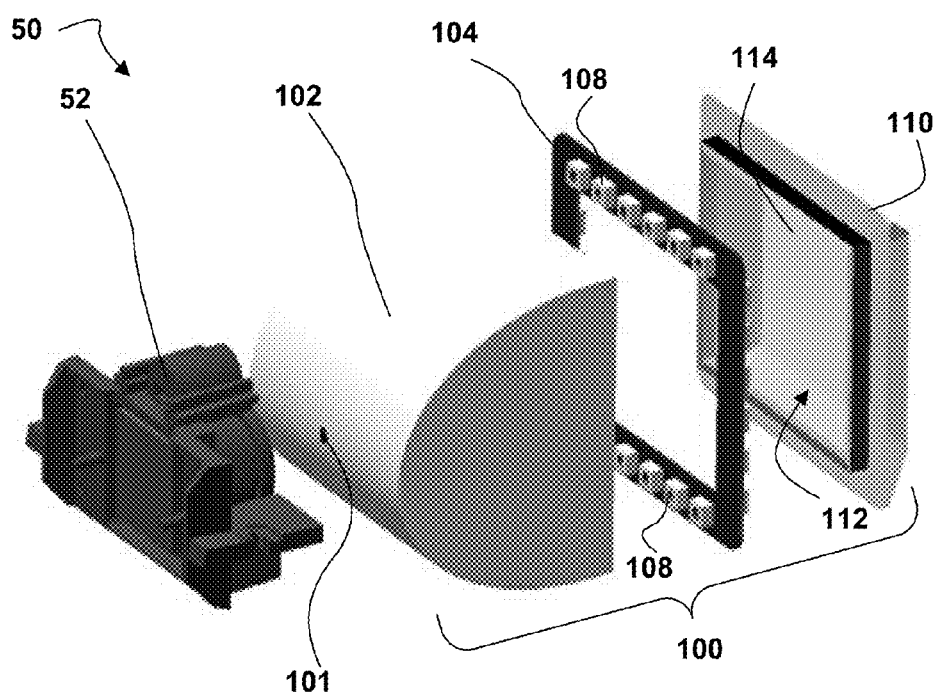
FIG. 1B is an exploded rear perspective view of the illuminator shown in FIG. 1A.
Figure 1C:
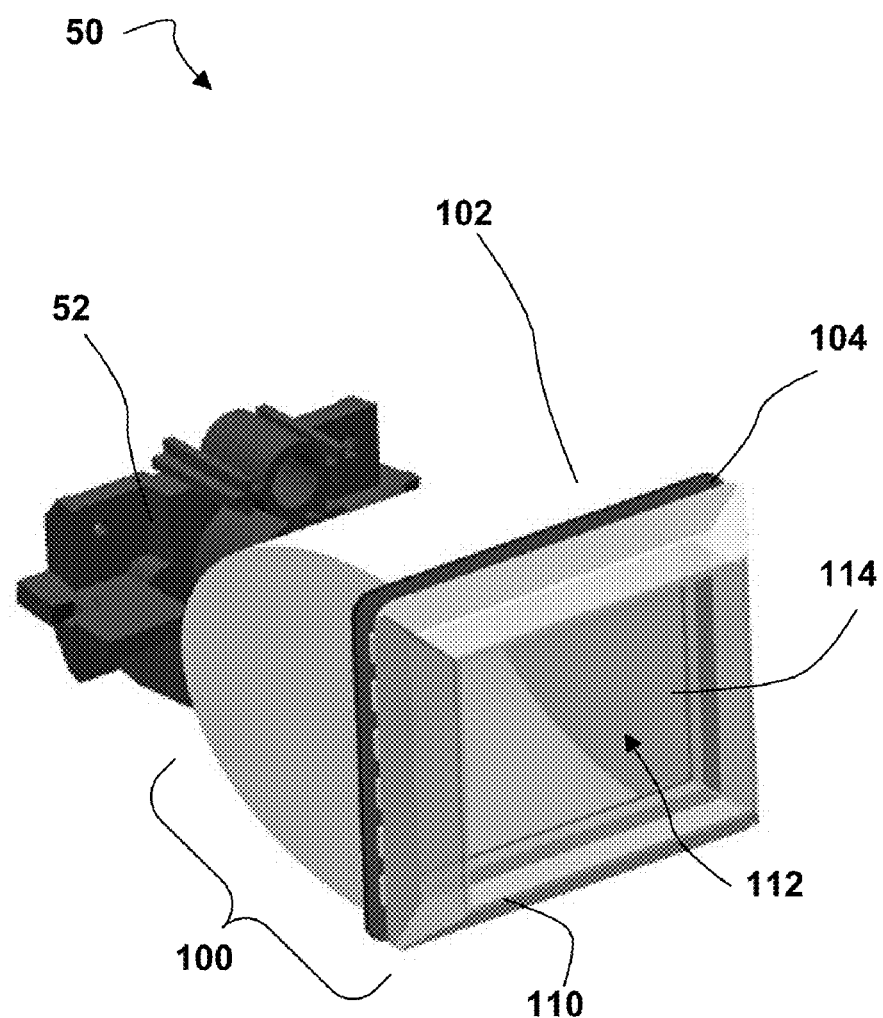
FIG. 1C is an assembled front perspective view of the illuminator shown in FIG. 1A.

FIGS. 1A-1C together illustrate an embodiment of an imaging system 50 that includes a camera 52 coupled to an embodiment of a dark field and bright field illuminator 100. Illuminator 100 includes a reflector 102 and a light module 104 positioned at the open end of the reflector. A light pipe assembly 110 is then positioned over light module 104. Light module 104 and light pipe assembly have openings therein that create an opening 112 through which light from reflector 102 can exit the illuminator. In some embodiments, illuminator 100 can include a cover 114 positioned over opening 112. The operation of imaging system 50 and illuminator 100 are discussed below in connection with FIGS. 8A-8D.

Reflector 102 is optically coupled to camera 52 through an imaging aperture 101 at the closed end of the reflector. In the illustrated embodiment reflector 102 is semi-cylindrical, but of course in other embodiments it can have a different shape. Details of reflector 102 are discussed below in connection with FIGS. 3A-3C and 4A-4F.

Light module 104 is positioned at the open end of reflector 102 and includes exterior light sources 106 on one side and interior light sources 108 on the opposite side. In this specification, "interior" and "exterior" do not refer to where the respective light sources are mounted in or on illuminator 100, but rather to the general direction in which the light sources emit light; "interior" light sources emit light generally toward the interior of reflector 102, while "exterior" light sources emit light in a direction other than toward the interior of reflector 102. Details of light module 104 are discussed below in connection with FIGS. 5A-5B and 6A-6C.

Light pipe assembly 110 is positioned over light module 104 and is aligned so that light from exterior light sources 106 will be launched into one end of the light pipe assembly and will exit through the other end of the light pipe assembly and be projected onto an object being imaged. In the illustrated embodiment light pipe assembly 110 includes four light pipe segments that form a rectangular annulus, but in other embodiments a greater or lesser number of light pipe segments can be used to form light pipe assemblies with different shapes than shown. Details of light pipe assembly 110 are discussed below in connection with FIGS. 7A-7E.

Figure 2A:
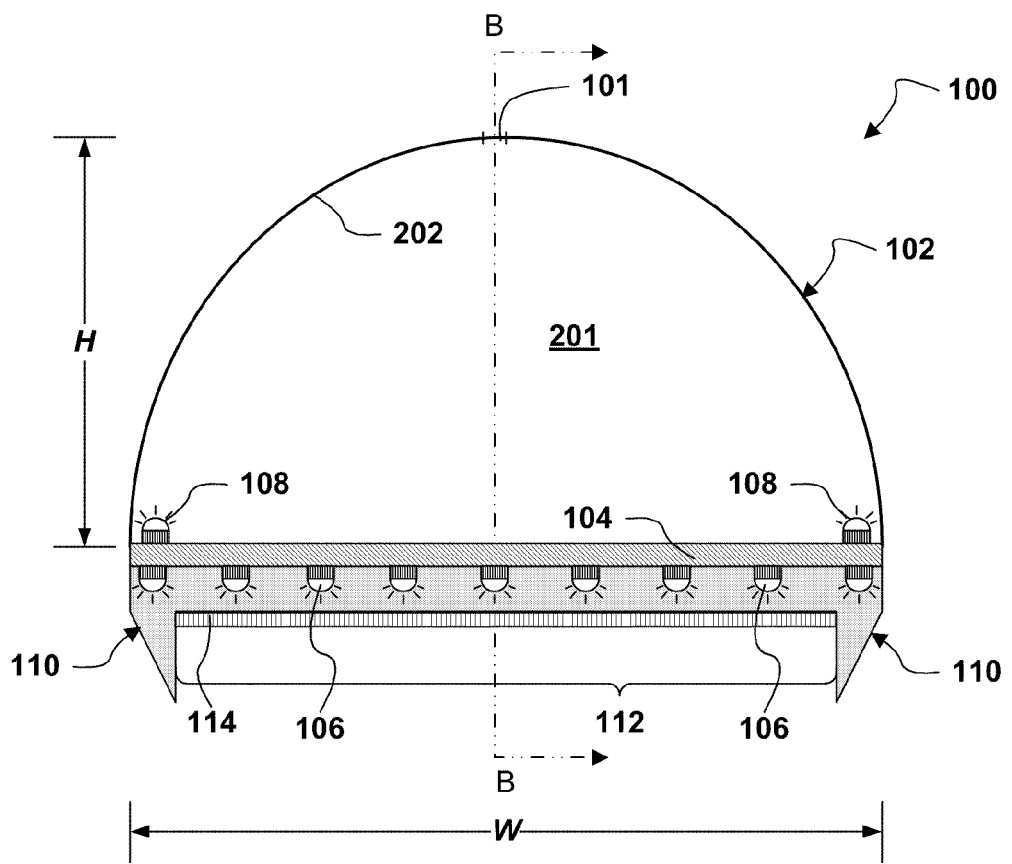
FIG. 2A is a side elevation view of the illuminator shown in FIGS. 1A-1C.

FIG. 2A illustrates a side elevation of illuminator 100. In the illustrated embodiment reflector 102 includes a curved light-reflecting and/or light diffusing surface 202 with a semicircular cross-section when viewed from the side. The semicircular cross-section results in curved surface 202 being semi-cylindrical, in this case shaped like an open right semicircular cylinder. Imaging aperture 101 can be formed in curved surface 202. Curved light-reflecting surface 202 is designed to reflect and/or diffuse incident light from interior light sources 108 and direct it out of the illuminator through opening 112. Curved surface 202 has a height H and width W, both of which are chosen based on the particular application and its requirement.

Light module 104 is positioned at the open end of reflector 102 such that interior light sources 108 will direct light toward the interior 201 of reflector 102, and thus toward surface 202. Exterior light sources 106 are on the opposite side of light module 104 and do not direct light toward the interior 201 of reflector 102, but instead direct their light into light pipe assembly 110.

Light pipe assembly 110 is positioned over light module and aligned so that the light module is sandwiched between the light pipe assembly and the open end of reflector 102. In one embodiment the light pipe assembly can be held in place by fastening it to light module 104, for instance using flange 712 (see FIG. 7), but in other embodiments it can also be secured by attaching it to reflector 102. Light pipe assembly 110 can also be attached by means of heat stakes positioned on the proximal end surfaces of segments 702, 704, 706 and 708.

Cover 114 is positioned over opening 112 to prevent contaminants or other objects from entering the illuminator through opening 112 and damaging the components in it. Although in the illustrated embodiment cover 114 is shown mounted to the interior edges of light pipe assembly 110, in other embodiments cover 114 could be mounted to some other part of the illuminator. In one embodiment cover 114 is transparent and is very thin to avoid compromising the optical uniformity of the illuminator, but in other embodiments the thickness of cover 114 can be greater or smaller and cover 114 can be made of a translucent material to provide additional diffusion. In still other embodiments, cover 114 can be a composite that includes at least two different portions selected from transparent, translucent or opaque. In some embodiments, cover 114 can include an anti-reflective coating on the inside, outside, or both the inside and the outside.

Figure 2B:
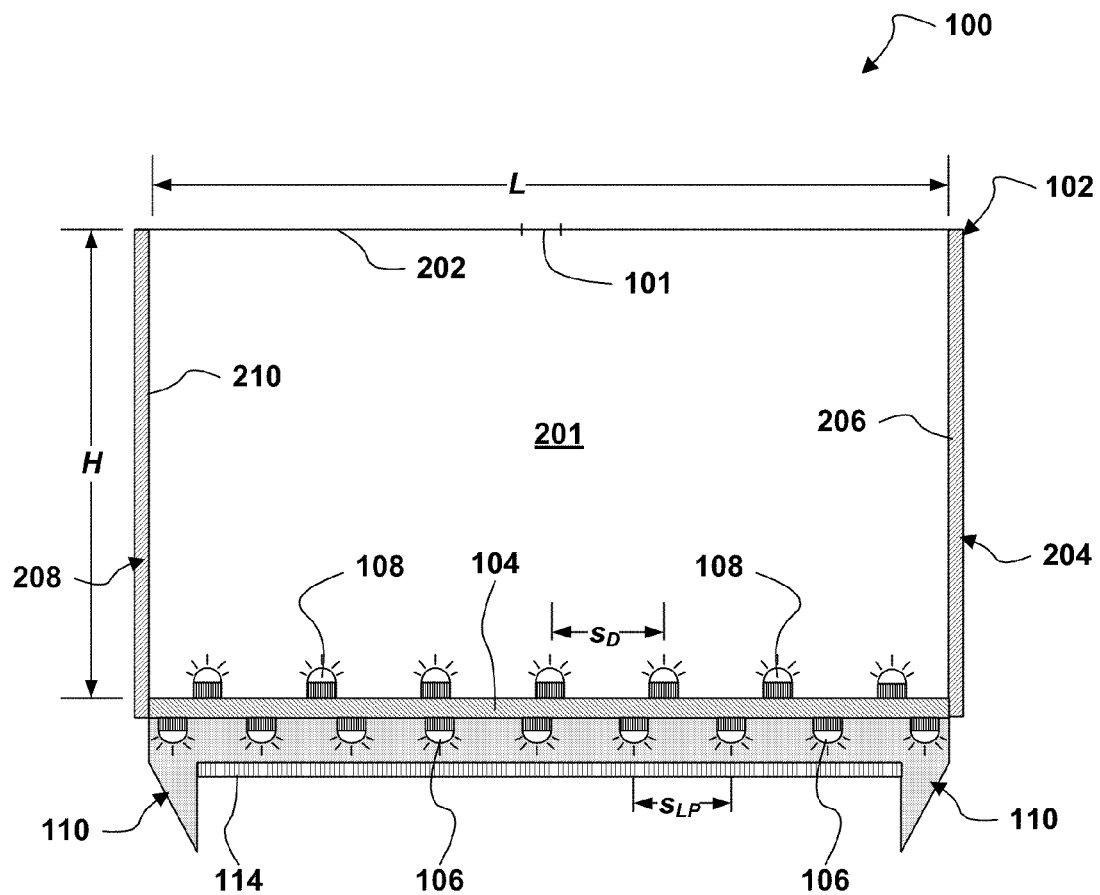
FIG. 2B is a front elevation view of the illuminator shown in FIG. 2A as viewed from section line B-B.

FIG. 2B illustrates a side elevation cross-section of illuminator 100. Curved light-reflecting surface 202 has a length L, meaning that reflective surfaces 206 and 210 are spaced apart by L; as with the illuminator's height H and width W, length L can be chosen based upon the application requirements. As in FIG. 2A, light module 104 is positioned at the open end of reflector 102 such that interior light sources 108 can direct light toward the interior 201 of reflector 102, and thus toward surface 202. Exterior light sources 106 are on the opposite side of light module 104 and do not direct light toward the interior 201 of reflector 102, but instead direct their light into light pipe assembly 110. Light pipe assembly 110 is positioned over light module and aligned so that exterior light sources 106 will direct their light into the light pipe assembly, and cover 114 is positioned over opening 112 to prevent contaminants or other objects from entering the illuminator through opening 112 and damaging the components in it.

Figure 3A:
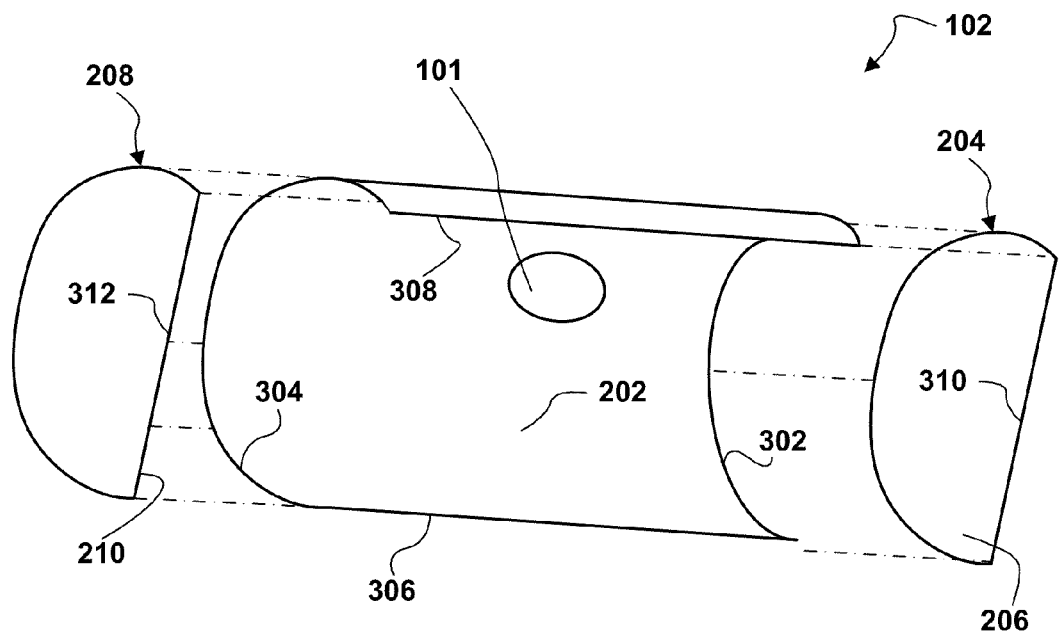
FIG. 3A is an exploded perspective view of an embodiment of a reflector for the illuminator shown in FIGS. 1A-1C.
Figure 3B:
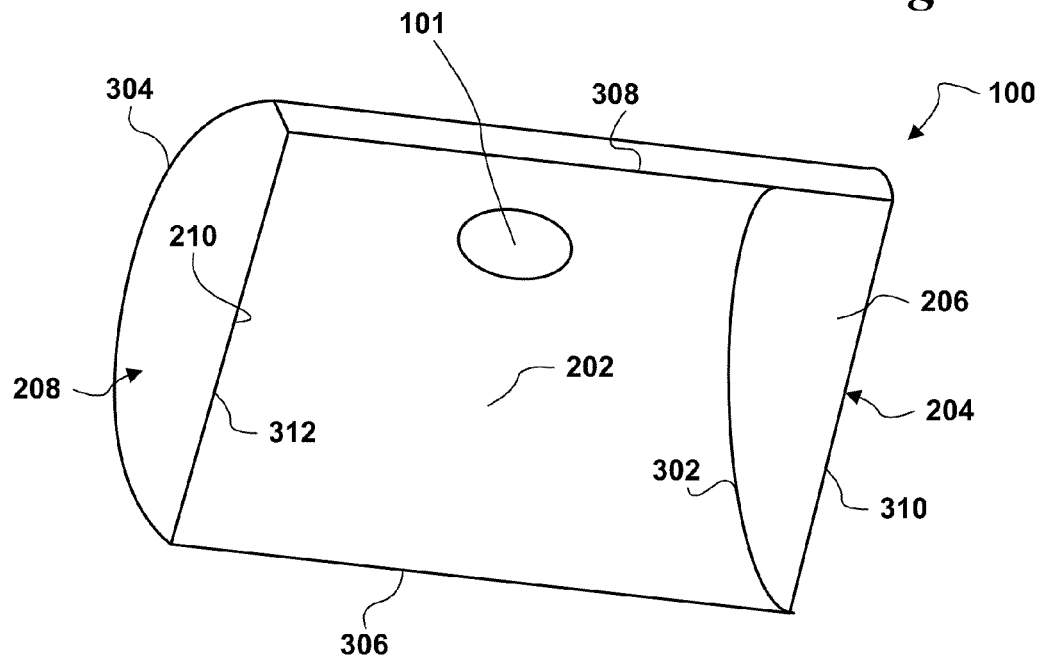
FIG. 3B is an assembled perspective view of an embodiment of a reflector for the illuminator shown in FIGS. 1A-1C.

FIGS. 3A-3B together illustrate an embodiment of an reflector 102; FIG. 1A illustrates an exploded view, while FIG. 1B illustrates an assembled view. Reflector 102 includes curved light-reflecting surface 202 that is bounded by curved edges 302 and 304, as well as by longitudinal edges 306 and 308. In the context of this application, "curved edges" includes any edge that is not a single straight line and includes, without limitation, curves that are smooth and continuous as well as curves made up of multiple straight or non-straight line segments, whether smooth and continuous or not. In the illustrated embodiment curved surface 202 is concave, but in other embodiments it can be convex or can be some combination of concave and convex.

In the embodiment shown, curved surface 202 is formed by bending a lamina into the appropriate shape. In one embodiment the lamina can be sheet metal, but in other embodiments a lamina made of other materials such as sheets of plastic or some kind of composite can be used. In still other embodiments surface 202 can be formed differently. For example, in one embodiment surface 202 can be machined out of a solid block of metal, plastic, wood, or some kind of composite.

For a given application, curved surface 202 should have the appropriate physical and/or optical properties—such as color, texture and reflectivity—to create the desired reflection and/or diffusion. In one embodiment the physical and/or optical characteristics of surface 202 can be matched to enhance or supplement the optical characteristics of interior light sources 208, but in other embodiments the physical and/or optical characteristics of surface 202 can be used to change of modify the optical characteristics of light emitted by interior light sources 108. For instance, in an embodiment where interior light sources 208 emit white light, by applying an appropriately colored coating to curved light-reflecting surface 202 the white light from interior light sources 208 can be filtered such that the color of light exiting the illuminator through opening 112 is not white.

The material from which surface 202 is made may already have the correct physical and/or optical properties, such that no further processing is needed once curved light-reflecting surface 202 has been formed. For example, in an embodiment in which surface 202 is formed by bending a lamina around a mold, the lamina could be of a plastic that already has the correct color, texture and reflectivity, meaning that nothing further needs to be done to the surface after it is formed. In other embodiments where the material does not have the needed color, reflectivity or texture—such as when curved surface 202 is formed of metal—then additional treatment may be needed to give curved light-reflecting surface 202 the correct physical and/or optical properties. In one embodiment, a coating such as paint can be applied to the surface. In other embodiments other treatments such as sheets of material with the correct physical and/or optical properties can be laid on curved light-reflecting surface 202 and secured with adhesive.

Each of longitudinal edges 306 and 308 extends from an endpoint of edge curved edge 302 to a corresponding endpoint of curved edge 304 to form surface 202. In the embodiment shown, curved edges 302 and 304 both have the same size and shape and longitudinal edges 306 and 308 are straight, meaning that surface 202 is semi-cylindrical and shaped substantially like an open right semi-circular cylinder. Put differently, in the illustrated embodiment curved light-reflecting surface 202 results from translating curved edge 302 in a straight line through space until it reaches or becomes curved edge 304. In other embodiments, however, curved edges 302 and 304 can have other shapes besides semi-circular (see FIGS. 4A-4F), and in still other embodiments curved edges 302 and 304 need not have the same size and/or shape, nor do longitudinal edges 306 and 308 need to have the same size and/or shape.

End caps 204 and 208 are attached to curved edges 302 and 304 and should substantially cover the open ends of the curved light-reflecting surface 202. In the illustrated embodiment, end caps 204 and 208 have substantially the same cross-sectional shape as the open ends of curved surface 202, but in other embodiments the end caps need not have exactly the same shape as the open ends. For example, one or both of end caps 204 and 208 could be square, so long as they substantially cover the ends of curved surface 202. End caps 204 and 208 are positioned such that edges 310 and 312 are substantially co-planar with longitudinal edge 306 and 308, forming a lip to which light module 104 can be mounted.

End cap 204 includes a reflective side 206 and end cap 208 includes a reflective side 210. End caps 204 and 208 are attached to the curved edges of surface 202 with their reflective surfaces 206 and 210 parallel or substantially parallel to each other and facing each other. In other embodiments, however, reflective surfaces 206 and 210 need not be parallel, but can be at an angle with respect to each other. In one embodiment reflective surfaces 206 and 210 are mirrors, but in other embodiments they can be other types of surface with reflectivities equal to or less than a mirror. In one embodiment, reflective surfaces 206 and 210 are first-surface mirrors, meaning that the reflective surface must be the first surface encountered by incident light. In other embodiments other kinds of mirror can be used. Reflective surfaces 206 and 210 can be formed in different ways. For instance, if end caps 204 and 208 are metal, reflective surfaces 206 and 210 can be formed by polishing the appropriate surface of each end cap. In other embodiments, a reflective coating can be applied to end caps 204 and 208, for example by spraying or by securing a sheet of reflective materials to the appropriate surface of each end cap. In still other embodiments more sophisticated methods such as electrolytic plating can be used.

Figure 3C:
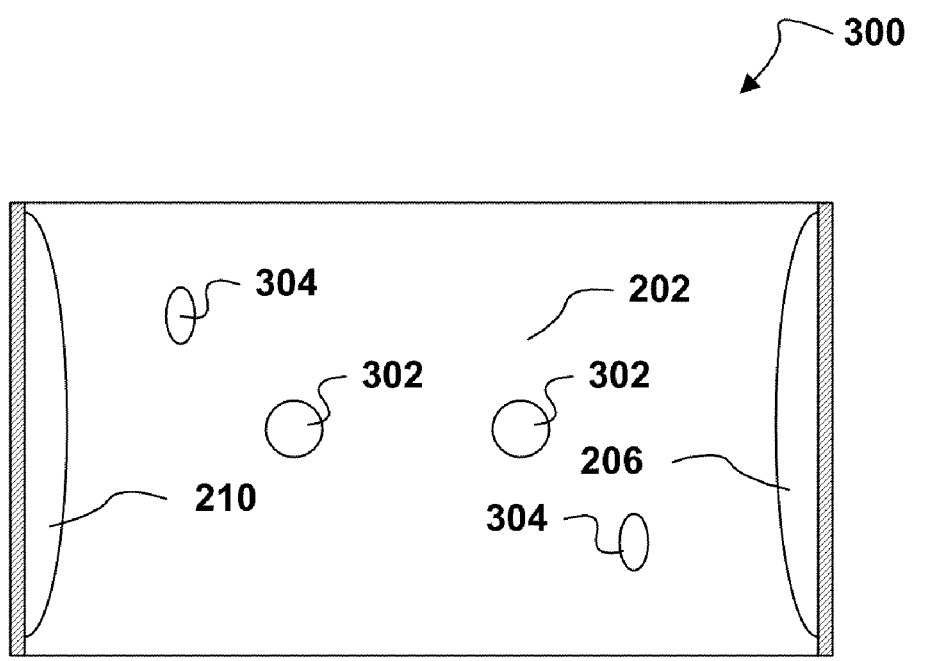
FIG. 3C is a plan view of the bottom of an alternative embodiment of a reflector for the illuminator shown in FIGS. 1A-1C.

FIG. 3C illustrates an alternative embodiment of an reflector 300. Reflector 300 is similar in most respects to reflector 102, the principal difference between being the presence in illuminator 300 of multiple imaging apertures and/or apertures that are positioned off the vertex or cusp of surface 202. These can include apertures 302 that are positioned on or near the centerline (e.g., at or near the vertex or cusp) curved surface 202, as well as apertures 304 that are positioned off the vertex or cusp of surface 202.

Figure 4A:
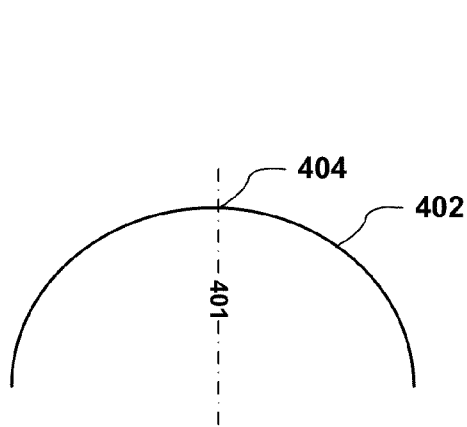
FIGS. 4A-4F are side elevation views of alternative embodiments of a reflector having different cross-sectional shapes.
Figure 4B:
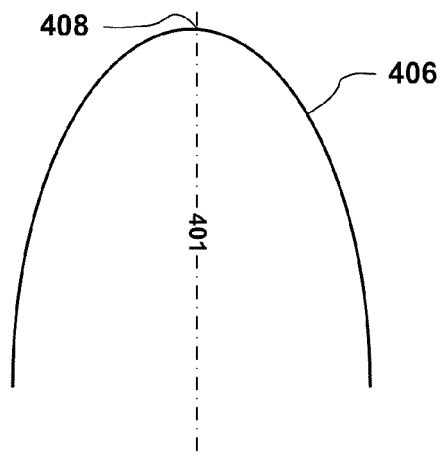
Figure 4C:
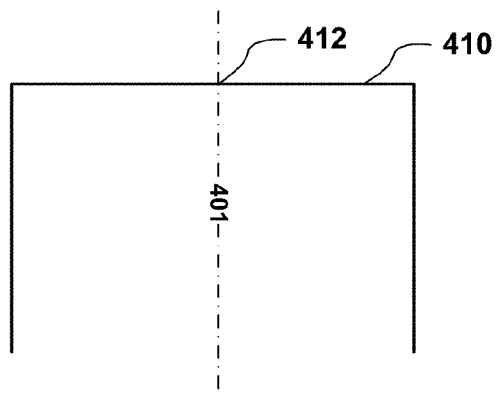
Figure 4D:
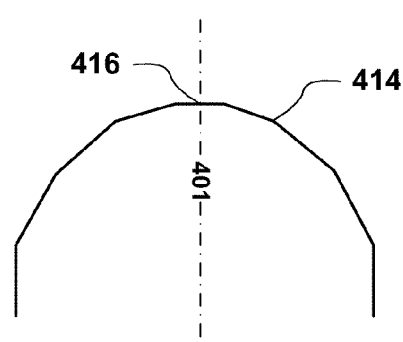

FIGS. 4A-4F illustrate cross-sections of various alternative embodiments of a reflector having different shapes for curved surface 202. FIG. 4A illustrates an embodiment in which the two curved edges of curved surface 402 are semi-elliptical and symmetrical about centerline 401, making curved surface 402 an open right semi-elliptical cylinder with its apex or cusp 404 aligned with the centerline. FIG. 4B illustrates an embodiment in which the two curved edges of curved surface 406 are parabolic and symmetrical about centerline 401, making the curved surface an open right parabolic cylinder its apex or cusp 408 aligned with the centerline. FIG. 4C illustrates an embodiment in which the curved edges of curved surface 410 are square and symmetrical about centerline 401, making curved surface 410 an open right square cylinder with its apex or cusp 412 aligned with centerline 401. FIG. 4D illustrates an embodiment in which the two curved edges of curved surface 414 are faceted (i.e., made up of a plurality of line segments) and symmetrical about centerline 401, making curved surface 414 an open right faceted cylinder with its apex or cusp 416 aligned with centerline 401.

Figure 4E:
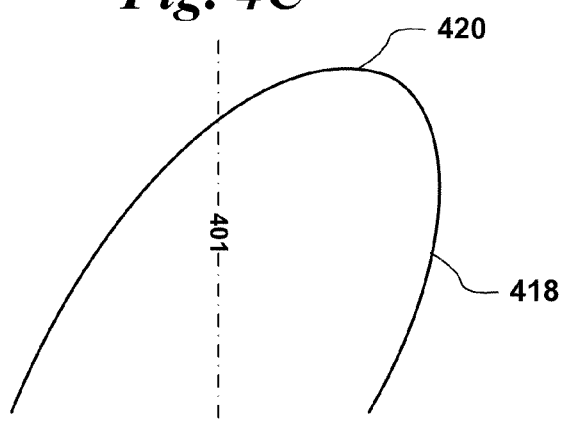
Figure 4F:
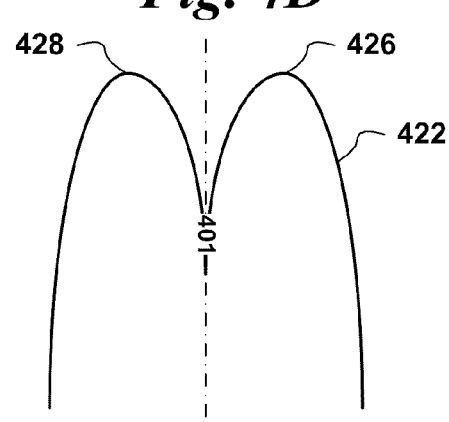

FIG. 4E illustrates an embodiment in which the curved edges of curved surface 418 are skewed parabolas that are not symmetrical about centerline 401, making curved surface a skewed right parabolic cylinder with its apex or cusp offset from centerline 401. Finally, FIG. 4F illustrates an embodiment in which the curved edges of curved surface 422 are compound curves, such as the illustrated M-shaped curve 422 that is symmetric about centerline 401 and has two cusps 426 and 428. In other embodiments with a compound curve, the curve need not be symmetrical about centerline 401. For example, in other embodiments the compound curve 422 can be skewed as shown in FIG. 4E, or the cusps 426 and 428 need not have the same height.

FIGS. 4A-4F are not intended to present an exhaustive catalog of possible shapes for a curved surface. In other embodiments, other shapes besides those shown can be used. For instance, in another embodiment any polynomial function can be used to form a curved surface, while in other embodiments other types of functions—such as exponential, logarithmic or hyperbolic functions—can be used.

Figure 5A:
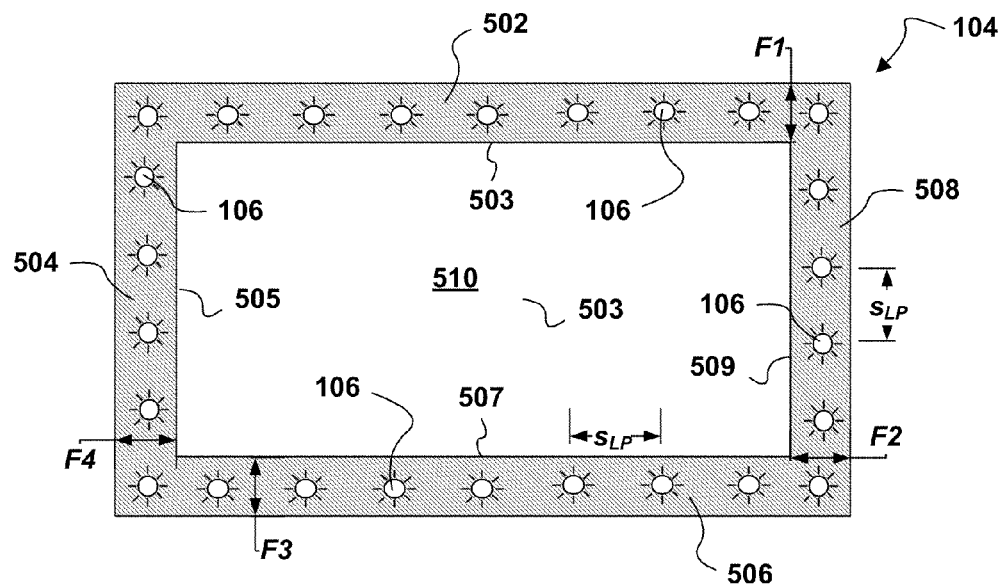
FIG. 5A is a plan view of a side of an embodiment of a light module for the embodiment of an illuminator shown in FIGS. 1A-1C.
Figure 5B:
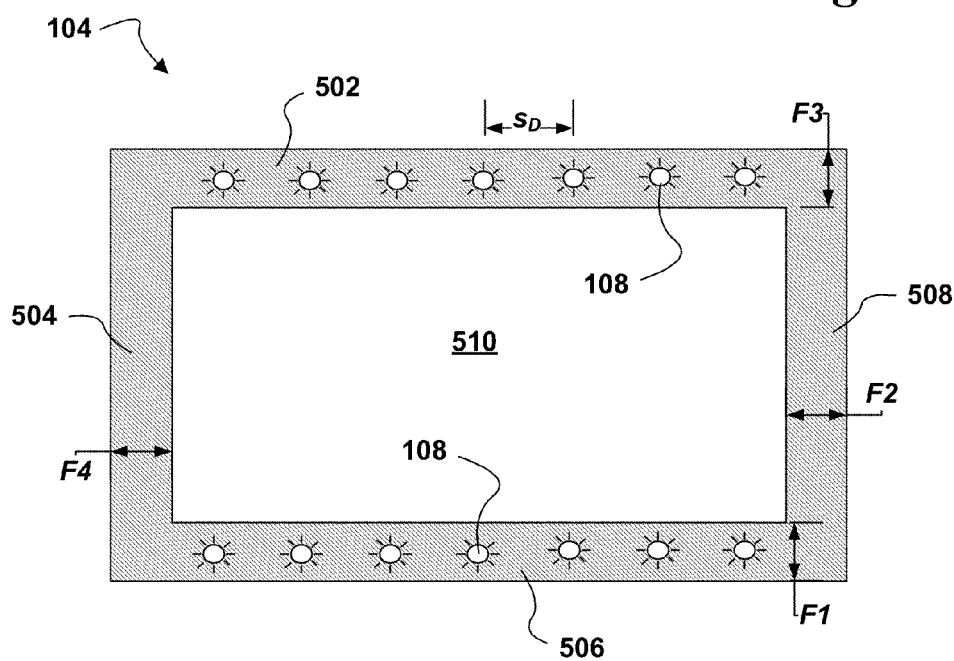
FIG. 5B is a plan view showing the opposite side of the light module shown in FIG. 5A.

FIGS. 5A-5B illustrate an embodiment of a light module 104; FIG. 5A illustrates the side with the exterior light sources, while FIG. 5B illustrates the opposite side with the interior light sources. Light module 104 is formed from a substrate and is shaped like a rectangular annulus made up of four segments 502, 504, 506 and 508. The shape and exterior dimensions of the annulus can correspond to shape and size of the open end of reflector 102, but in other embodiments light module 104 can have a different shape and/or size than the opening of reflector 102. In still other embodiments, light module 104 can include a greater or lesser number of segments and can have a different shape and size than shown. In one embodiment the substrate used to form the rectangular annulus is a single- or multi-layered printed circuit board, but in other embodiments other substrates such as plastics or metals can be used.

Each of segments 502-508 has an interior edge: segment 502 has an interior edge 503, segment 504 has an interior edge 505; segment 506 has an interior edge 507 and segment 508 has an interior edge 509. Interior edges 503-509 form the boundary of opening 510 in the middle of the rectangular annulus. Segments 502-508 have widths F1-F4, respectively, which are chosen based on the requirements of light sources 106 and 108, as well as the required size of opening 510. In the illustrated embodiment widths F1-F4 are equal, but in other embodiments widths F1-F4 need not be equal.

Exterior light sources 106 are positioned and mounted along segments that form the rectangular annulus. In the illustrated embodiment exterior light sources 106 are positioned on all four segments 502-508 such that there are light sources all the way around opening 510, but in other embodiments there need not be light sources present on all the segments. The type and number of exterior light sources 106 will depend on the type of light source used, as well as the power requirements of the application and the desired lighting characteristics such as color and uniformity. In one embodiment exterior light sources 106 can be light emitting diodes (LEDs), but in other embodiments exterior light sources 106 can be another type of light source, such as incandescent or halogen light bulbs. In still other embodiments, exterior light sources 106 need not all be the same kind, but can instead include combinations of two or more different types of light source. The spacing $S_{LP}$ between exterior light sources 106 will generally depend on the number of exterior light sources and the length of the segment on which they are mounted. The illustrated embodiment shows light sources 106 uniformly spaced at a fixed interval $S_{LP}$, but in other embodiments the exterior light sources need not be uniformly spaced. Although not shown, light module 104 can also include provisions, such as traces on a printed circuit board, for routing electrical power to exterior light sources 106.

FIG. 5B illustrates the side of light module 104 having interior light sources 108; in most embodiments, this will be the side of light module 104 opposite the side with exterior light sources 106. In the illustrated embodiment, interior light sources 108 are positioned only on segments 502 and 506, although in other embodiments interior light sources can be present on a greater or lesser number of segments. The type and number of interior light sources 108 will depend on the type of light source used, as well as the power requirements of the application and the desired lighting characteristics such as color and uniformity. In one embodiment interior light sources 108 can be light emitting diodes (LEDs), but in other embodiments interior light sources 108 can be another type of light source, such as incandescent or halogen light bulbs. In still other embodiments, interior light sources 108 need not all be the same kind, but can instead include combinations of two or more different types of light source. The spacing SD between light sources will generally depend on the number of interior light sources 108 and the length of the segment on which they are mounted. The illustrated embodiment shows light sources 108 uniformly spaced at a fixed interval SD, but in other embodiments interior light sources 108 need not be uniformly spaced. Although not shown, light module 104 can also include provisions, such as traces on a printed circuit board, for routing electrical power to interior light sources 108.

Figure 6A:
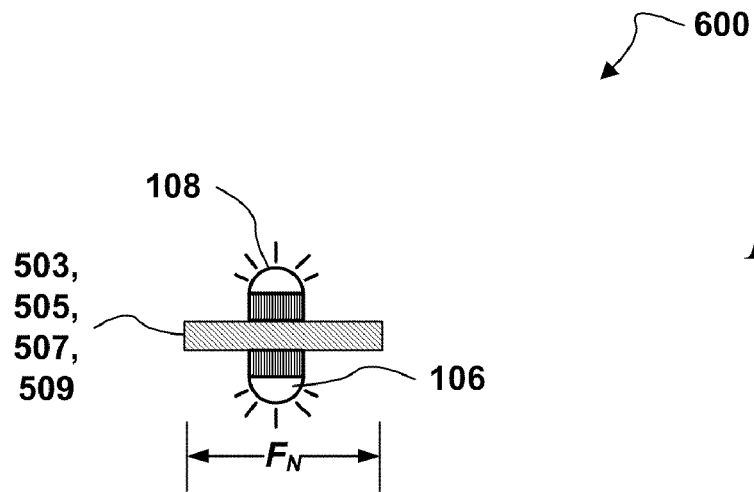
FIGS. 6A-6C are sectional views of alternative embodiments of edge treatments for the light module shown in FIGS. 5A-5B.
Figure 6B:
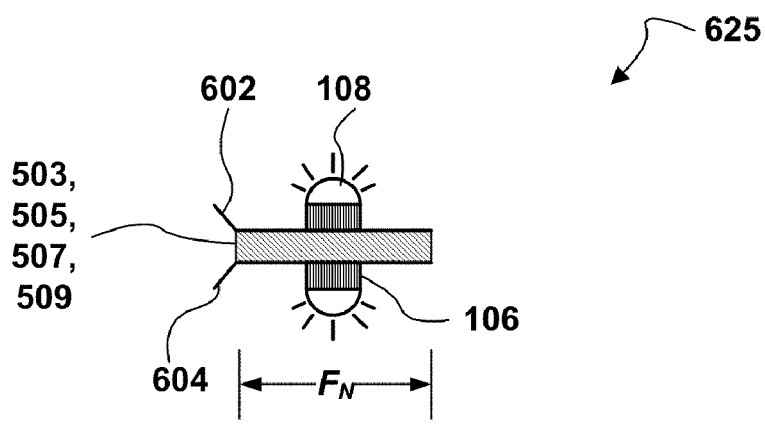
Figure 6C:
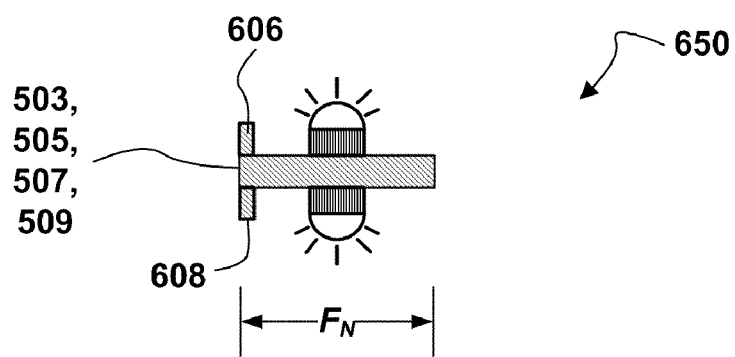

FIGS. 6A-6C illustrate alternative embodiments of edge treatments for interior edges 503-509 of light module 104. Generally, it is desirable to prevent light from exterior light sources 106 from entering reflector 102 and to prevent light from interior light sources 108 from exiting the reflector directly without reflecting from surface 202 (see FIG. 2A). FIG. 6A illustrates an embodiment 600 in which segments 502, 504, 506 and 508 are substantially flat and have widths F1-F4, respectively. In this embodiment edges 503, 505, 507 and 509 require no special treatment, but widths F1-F4 should be sized so that no direct light from interior light sources 108 exits the illuminator through opening 110 (see, e.g., FIG. 2A) and no light from exterior light sources 106 enters the reflector.

FIG. 6B illustrates an alternative embodiment 625 in which edges 503, 505, 507 and 509 can include one or both of an upturned portion 602 and a downturned portion 604. Upturned portion 602 and downturned portion 604 can help in preventing light from interior light sources 108 from directly exiting the illuminator through opening 120 and preventing light from exterior light sources 106 from entering enters the reflector (see, e.g., FIG. 2A). With the presence of upturned portion 602 and downturned portion 604, it can also be possible to reduce the widths F1-F4 of segments 502, 504, 506 and 508. In an embodiment in which one or both of upturned portion 602 and downturned portion 604 are present they can run along the entire length of an edge, but in other embodiments they can run along only a portion of an edge. In some embodiments of light module 104, one or both of upturned portion 602 and downturned portion 604 can be present along some edges but not others.

FIG. 6C illustrates an alternative embodiment 650 in which each edge 503, 505, 507 and 509 can include one or both of an upper baffle 606 and a lower baffle 608. In one embodiment, baffles 606 and 608 can be made of an opaque material, but in other embodiments the baffles can be made of a translucent or transparent material or can be made of some combination of two or more of opaque, translucent or transparent material. In other embodiments, both baffles need not be made of the same materials. By correctly sizing, positioning and choosing materials for baffles 606 and 608, the baffles can help in preventing light from interior light sources 108 from directly exiting the illuminator through opening 120 and preventing light from exterior light sources 106 from entering enters the reflector (see, e.g., FIG. 2A). The presence of baffles 606 and 608 can also make it possible to reduce the widths F1-F4 of segments 502, 504, 506 and 508. In one embodiment, baffles can run along the entire length of an edge, but in other embodiments baffles can be present only along portions of an edge. In some embodiments of light module 104, one or both of baffles 606 and 608 can be present along some edges but not others.

FIGS. 7A-7B illustrate an embodiment of light pipe assembly 110; FIG. 7A is a plan view, while FIG. 7B is a sectional view. In plan view, light pipe assembly 110 is shaped like a rectangular annulus made up of four light pipe segments 702, 704, 706 and 708 whose ends connect such that the segments are at right angles to each other. Segments 702-708 surround an opening 710, thus forming the rectangular annulus. In an embodiment of light pipe assembly 110 that includes more than one light pipe segment light pipe segments 702-708 can all have the same cross-sectional shape (see FIG. 7B), but in other embodiments light pipe segments 702-708 need not all have the same cross-sectional shape. In other embodiments, light pipe assembly 110 can include a greater or lesser number of segments. Moreover, although referred to as an "assembly," in other embodiments light pipe assembly 110 can be made up of one or more unconnected light pipe segments. In one embodiment light pipe assembly 110 can be made of an optically transparent material such as glass or plastic, but in other embodiments in which diffusion is desired the light pipes can be made of a translucent material or can be made of a transparent material with surfaces treated to create diffusion.

Flange 712 is positioned at or near the perimeter of opening 710 on the side of light pipe assembly 110 that will face light module 104. In one embodiment, the external dimensions of flange 712 can substantially correspond to the internal dimensions of opening 510 of light module 104, so that flange 712 engages with edges 503, 505, 507 and 509 to hold light pipe assembly 110 in place. In other embodiments, however, flange 712 need not be present and light pipe assembly 110 can be held in place by other means such as fasteners or adhesives. In still other embodiments, both flange 712 and other means can be used together to hold light pipe assembly in place.

In the illustrated embodiment the shape and exterior dimensions of light pipe assembly 110 substantially correspond to the shape and size of light module 104, but in other embodiments light module 104 can have a different shape and/or dimensions than the light module. For instance, in an embodiment of light module 104 that does not have exterior light sources 106 on every segment 502, 504, 506 and 508, the light pipe assembly would only need to have light pipe segments corresponding to the segments of the light module with exterior light sources.

FIG. 7B illustrates an embodiment of the cross-section of light pipe assembly 110, as well as an embodiment of the cross sections of individual light pipe segments 704 and 708 within the light pipe assembly. Flange 712 projects from the side of the light pipe assembly that will be coupled to light module 104 and, in embodiment where it is present, helps to align the light pipe assembly with the light module and hold the two together as described above.

Light pipe segment 704 includes a proximal end 713 through which light is launched into the light pipe segment by exterior light sources 106, as shown by the arrows. Light pipe segment 704 also includes a distal tip 716. Between proximal end 713 and distal tip 716, light pipe segment 704 has a constant cross-section portion 714, as well as a tapered portion 715 formed by surfaces Z1 and Z2 that are at an angle $\gamma$ with respect to each other. In the illustrated embodiment tapered portion 715 has a taper ratio (the ratio of the smallest width to the largest width in the tapering portion) of zero, meaning it tapers to a sharp tip. In other embodiments, however, the light pipe segment can have a non-zero taper ratio. In operation, a certain portion of the light launched into proximal end 713 will exit the light pipe segment through surface Z1, while a certain amount will exit through surface Z2, as shown in the figure for segment 708. The relative magnitudes of the two portions can be changed by adjusting the size, shape and material of the light pipe assembly or the individual light pipe segments.

FIG. 7C-7E illustrate alternative embodiments of cross-sectional shapes for individual light pipes in light pipe assembly 110. FIG. 7C illustrates a double-tapered light pipe that includes portions having different taper ratios. One tapered portion is formed by surfaces Z1 and Z2$a$, which are at an angle $\gamma_2$ with respect to each other, while the other tapered portion is formed by surfaces Z1 and Z2$b$, which are at an angle $\gamma_1$ relative to each other. The illustrated embodiment tapers to a sharp tip, but as with light pipe segment 704, it need not taper to a sharp tip. FIG. 7D illustrates an embodiment in which the light pipe segment is tapered by making surface Z1 planar while making surface Z2 curved. FIG. 7E illustrates an embodiment in which surface Z2 is planar, while surfaces Z1$a$ and Z1$b$ are positioned at different angles relative to surface Z2.

Figure 8A:
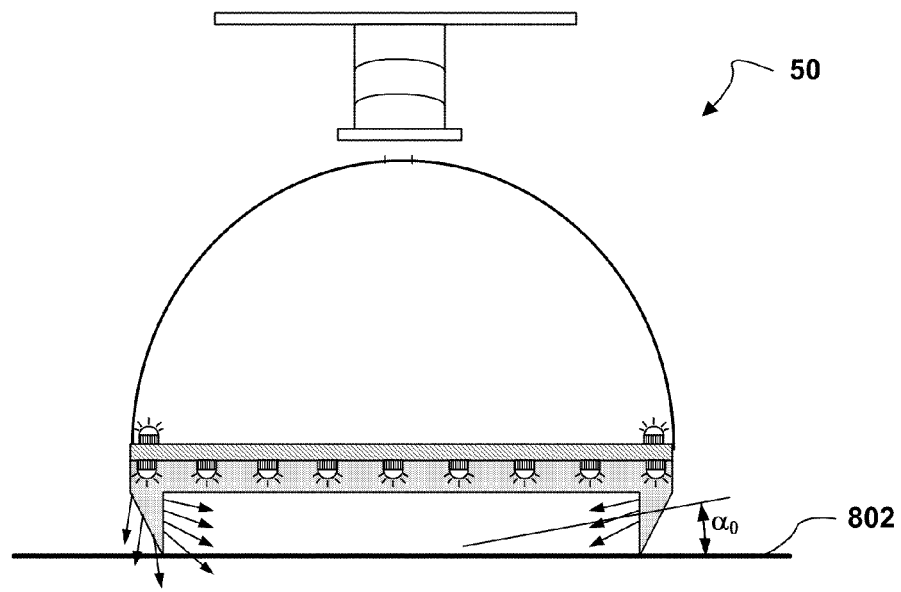
FIGS. 8A-8D are sectional views showing an embodiment of the operation of the illuminator shown in FIGS. 1A-1C.

FIGS. 8A-8D illustrate an embodiment of the operation of an imaging system 50 using illuminator 100. FIG. 8A illustrates use of the dark field mode of the illuminator. Illuminator 100 is position such that the tips of light pipe assembly 110 are in contact with a surface 802 and such that the light pipe assembly surrounds an object to be imaged. Exterior light sources 106 are turned on, launching light into light pipe assembly 110. Light travels through each light pipe segment and exits through surface Z1 at a low angle $\alpha_0$ relative to surface 802. In one embodiment where the tips of light pipe assembly 110 are in contact with surface 802 $\alpha_0$ has a value of approximately 5 degrees, but in other embodiments the shape, size and material of the light pipes can be adjusted to make $\alpha_0$ larger or smaller. In different embodiments, for example, $\alpha_0$ can be between about zero and about 20 degrees.

Figure 8B:
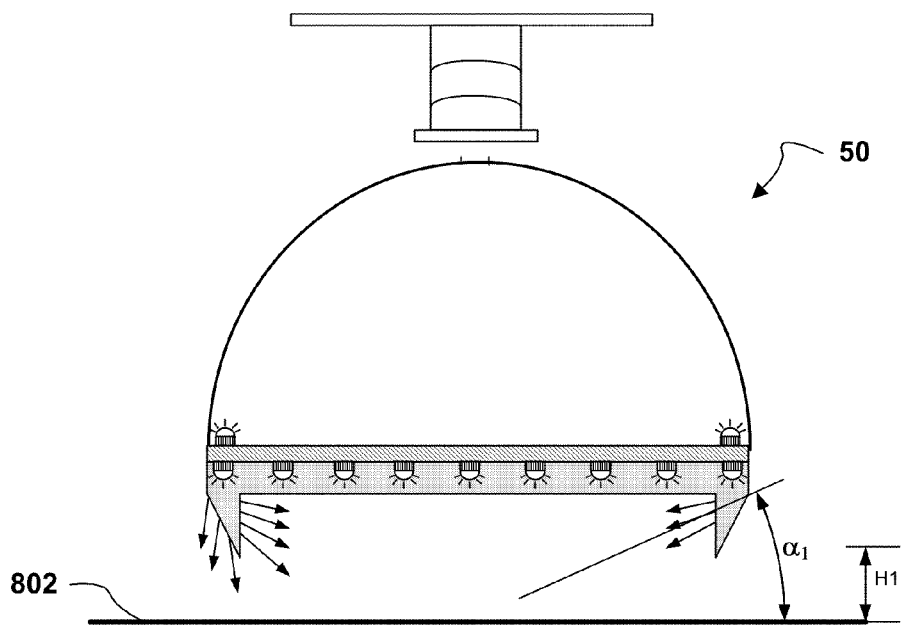

FIG. 8B illustrates an embodiment in which the imaging system 50 is held so that the tips of light pipe assembly 110 are held at a finite height H1 above surface 802. Light exits each light pipe through surface Z1 and impinges on surface 802 in the field of view of camera 52 at an angle $\alpha_1$ relative to the surface, but because of height H1, angle $\alpha_1$ is greater than angle $\alpha_0$ shown in FIG. 8A. In one embodiment if H1 is approximately 0.25 inches, $\alpha_1$ can be about 30 degrees, while if H1 is approximately 0.5 inches, $\alpha_1$ can be about 45 degrees. Of course, in other embodiments the shape, size and material of the light pipes can be adjusted to make $\alpha_1$ larger or smaller for a given H1.

Figure 8C:
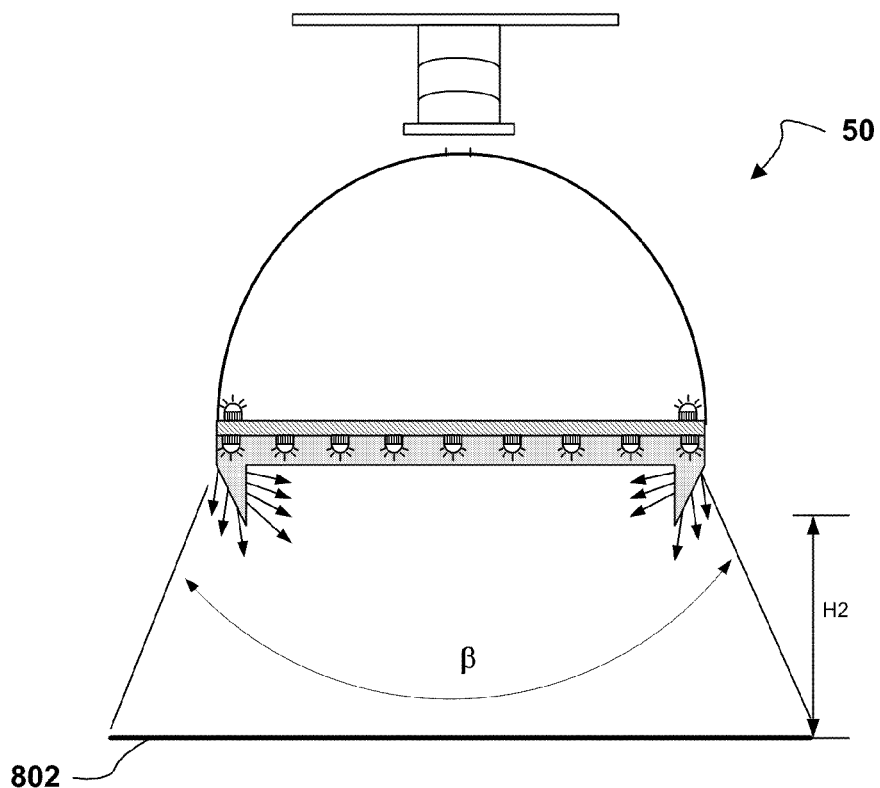

FIG. 8C illustrates an embodiment in which the imaging system 50 is held so that the tips of light pipe assembly 110 are held at a finite height H2 above surface 802, where H2 is substantially greater than H1 shown in FIG. 8B. At height H2, light exiting through both surface Z1 and Z2 of each light pipe impinges on surface 802 in the field of view of camera 52. In one embodiment, about half the light exits through each surface (i.e., 50% through Z1 and 50% through Z2), but in other embodiments the fraction of light exiting through each surface can be adjusted by adjusting the shape, size and materials of the light pipe assembly. With the field of view illuminate with light exiting through both surfaces Z1 and Z2, illuminator 100 can provide $\beta$ degrees of forward-emitting general purpose lighting that can be used, for instance, for far range imaging. In one embodiment $\beta$ has a value of about 40 degrees, but angle $\beta$ can be adjusted by adjusting the shape, size and materials of the light pipe assembly.

Figure 8D:
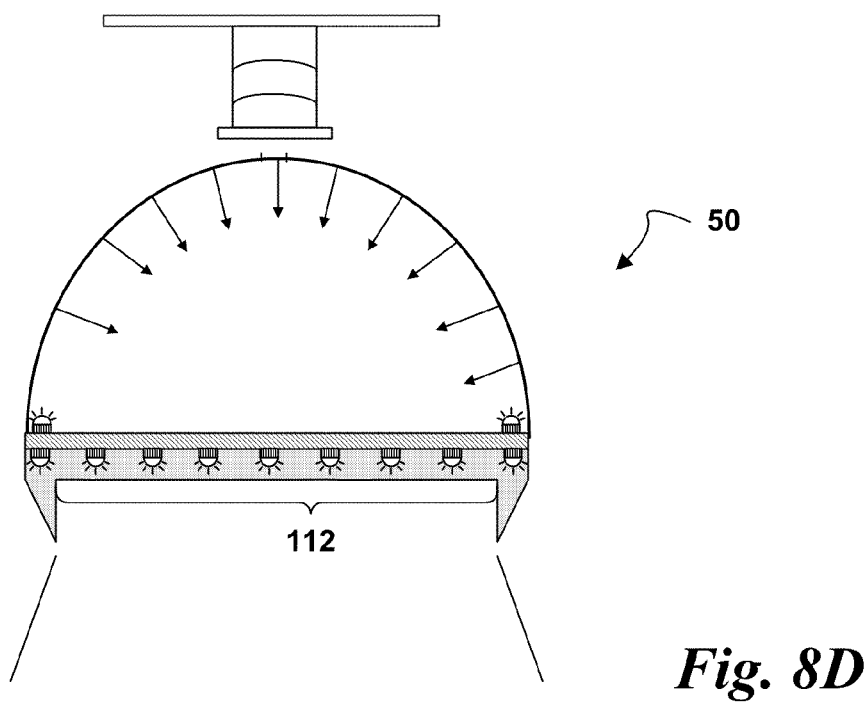

FIG. 8D illustrate an embodiment in which imaging system 50 uses its bright field capabilities. Exterior lights 106 are turned off and interior lights 108 are turned on, such that light from interior lights 108 is reflected off the curved reflecting surface of reflector and is directed out of the illuminator through opening 112. If appropriately made or treated, the reflective surface of reflector 120 can also be used to diffuse light in addition to reflecting it, thus providing uniform of forward-emitting general purpose lighting that can be used for bright field imaging.

Figure 9:
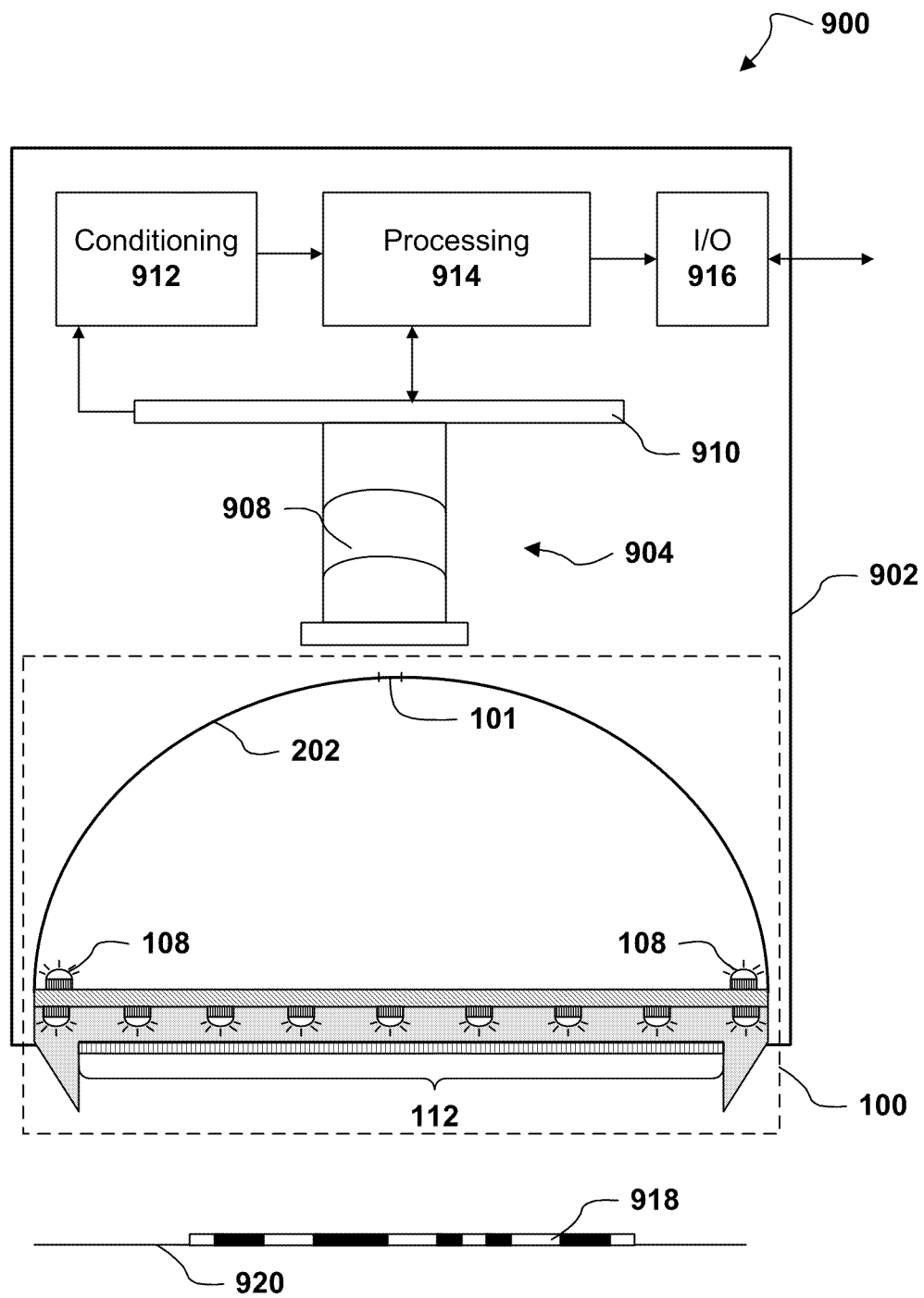
FIG. 9 is a schematic diagram of an alternative embodiment of imaging system incorporating the imaging system shown in FIGS. 1A-1C.

FIG. 9 illustrates an alternative embodiment of an imaging system 900, which includes camera 904 and illuminator 100; of course, in other embodiments of imaging system 900 the illuminator 100 can be replaced with any of the other illuminator embodiments described herein. Imaging system 900 includes a housing 902 within which are positioned illuminator 100 and camera 904. In addition to camera 904 and illuminator 100, imaging system 900 includes a signal conditioner 912 coupled to image sensor 910, a processor 914 coupled to signal conditioner 912, and an input/output unit 916 coupled to processor 914. Although not shown, an internal or external power supply provides electrical power to the components within housing 902. In one embodiment, imaging system 900 can be a small portable handheld system, but in other embodiments it can be a fixed-mount imaging system.

Illuminator 100 is positioned within housing 902 such that opening 112 will face toward an object to be illuminated and imaged. In the illustrated embodiment, the object to be illuminated and images is an optical symbol such as a bar code or matrix code 918 on a surface 920, but in other embodiments the object can be a part or surface of a part that is subject to machine vision inspection. Interior lights 108 or exterior lights 106 are turned on, as appropriate, to illuminate object 918 on surface 920.

Camera 904 includes optics 908 coupled to an image sensor 910. In one embodiment, optics 908 include one or more refractive lenses, but in other embodiment optics 908 can include one or more of refractive, reflective or diffractive optics. In one embodiment, image sensor 910 includes a CMOS image sensor, although in other embodiments different types of image sensors such as CCDs can be used. Image sensor 910 and optics 908 are positioned within housing 902 such that optics 908 are optically aligned with imaging aperture 101 in curved surface 202. Optically aligning optics 908 with imaging aperture 101 allows optics 908 to focus an image of object 918 onto image sensor 910, enabling image sensor 910 to capture an image of object 918 while illuminator 100 simultaneously illuminates the object.

Signal conditioner 912 is coupled to image sensor 910 to receive and condition signals from a pixel array within image sensor 910. In different embodiments, signal conditioner 912 can include various signal conditioning components such as filters, amplifiers, offset circuits, automatic gain control, analog-to-digital converters (ADCs), digital-to-analog converters, etc. Processor 914 is coupled to signal conditioner 912 to receive conditioned signals corresponding to each pixel in the pixel array of image sensor 910. Processor 914 can include a processor and memory, as well as logic or instructions to process the image data to produce a final digital image and to analyze and decode the final image. In one embodiment, processor 914 can be a general-purpose processor, while in other embodiments it can be an application specific integrated circuit (ASIC) or a field-programmable gate array (FPGA). Processor 914 can also be coupled to image sensor 910 to monitor its function and/or provide a control signal for it to alter its function.

Input/output circuit 916 is coupled to processor 914 to transmit the image and/or information decoded from the image to other components (not shown) that can store, display, further process, or otherwise use the image data or the decoded information. Among other things, input/output circuit 916 can include a processor, memory, storage, and hardwired or wireless connections to one or more other computers, displays or other components.

In the illustrated embodiment, elements 912, 914 and 916 are shown co-housed with camera 901 and illuminator 100, but in other embodiments, elements 912, 914 and 916 can be positioned outside housing 902. In still other embodiments one or more of elements 912, 914 and 916 can be integrated within image sensor 910.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a curved reflector having an interior and an open end, wherein the curved reflector is a semi-cylindrical reflector comprising:
a curved light-reflecting surface including a pair of opposing curved edges and a pair of opposing longitudinal edges that extend between corresponding endpoints of the opposing curved edges, and
a pair of reflective surfaces, each reflective surface being attached to a corresponding one of the curved edges and each reflective surface having a straight edge in the same plane as the opposing longitudinal edges;
a light module positioned around a perimeter of the open end of the reflector, the light module including a first side having one or more interior light sources thereon to direct light toward the interior of the reflector and a second side having one or more exterior light sources thereon to direct light away from the reflector; and
a light pipe coupled to the light module and aligned so that light from the one or more exterior light sources is launched into the light pipe.

2. The apparatus of claim 1 wherein the curved light-reflecting surface has a light-diffusing coating thereon.

3. The apparatus of claim 1 wherein the shapes of the opposing curved edges are one of semi-circular, parabolic, hyperbolic, semi-elliptical or skewed parabolic.

4. The apparatus of claim 1 wherein the pair of reflective surfaces are planar and are parallel to each other or substantially parallel to each other.

5. The apparatus of claim 1, further comprising an imaging aperture in the curved reflector.

6. The apparatus of claim 1 wherein the light module is a rectangular annulus.

7. The apparatus of claim 6 wherein the one or more interior light sources are positioned only along two opposite edges of the rectangular annulus.

8. The apparatus of claim 6 wherein the one or more exterior light sources are positioned along all four edges of the rectangular annulus.

9. The apparatus of claim 1 wherein the light pipe is shaped like a rectangular annulus and comprises four segments.

10. The apparatus of claim 9 wherein each segment of the light pipe tapers between a proximal end positioned near the exterior light sources and a distal tip spaced apart from the proximal end.

11. A system comprising:
an illuminator comprising:
a curved reflector having an interior and an open end, wherein the curved reflector is a semi-cylindrical reflector comprising:
a curved light-reflecting surface including a pair of opposing curved edges and a pair of opposing longitudinal edges that extend between corresponding endpoints of the opposing curved edges, and
a pair of reflective surfaces, each reflective surface being attached to a corresponding one of the curved edges and each reflective surface having a straight edge in the same plane as the opposing longitudinal edges;
a light module positioned around a perimeter of the open end of the reflector, the light module including a first side having one or more interior light sources thereon to direct light toward the interior of the reflector and a second side having one or more exterior light sources thereon to direct light away from the reflector, and
a light pipe coupled to the light module and aligned so that light from the one or more exterior light sources is launched into the light pipe; and
a camera including imaging optics optically coupled to an imaging aperture in the curved reflector.

12. The system of claim 11 wherein the curved light-reflecting surface has a light-diffusing coating thereon.

13. The system of claim 11 wherein the shapes of the opposing curved edges are one of semi-circular, parabolic, hyperbolic, semi-elliptical or skewed parabolic.

14. The system of claim 11 wherein the pair of reflective surfaces are planar and are parallel to each other or substantially parallel to each other.

15. The system of claim 11 wherein the light module is a rectangular annulus.

16. The system of claim 15 wherein the one or more interior light sources are positioned only along two opposite edges of the rectangular annulus.

17. The system of claim 15 wherein the one or more exterior light sources are positioned along all four edges of the rectangular annulus.

18. The system of claim 11 wherein the light pipe is shaped like a rectangular annulus and comprises four segments.

19. The system of claim 18 wherein each segment of the light pipe tapers between a proximal end positioned near the exterior light sources and a distal tip spaced apart from the proximal end.

20. The system of claim 11, further comprising a signal conditioning circuit coupled to the camera.

21. The system of claim 20, further comprising a processor coupled to the signal conditioning unit and to the camera.

22. The system of claim 21, further comprising an input/output unit coupled to the processor.

23. A process comprising:
forming a curved reflector having an interior and an open end, wherein the curved reflector is a semi-cylindrical reflector comprising:
a curved light-reflecting surface including a pair of opposing curved edges and a pair of opposing longitudinal edges that extend between corresponding endpoints of the opposing curved edges, and
a pair of reflective surfaces, each reflective surface being attached to a corresponding one of the curved edges and each reflective surface having a straight edge in the same plane as the opposing longitudinal edges;
positioning a light module around a perimeter of the open end of the reflector, the light module including a first side having one or more interior light sources thereon to direct light toward the interior of the reflector and a second side having one or more exterior light sources thereon to direct light away from the reflector; and
coupling a light pipe to the light module and aligning the light pipe so that light from the one or more exterior light sources is launched into the light pipe.

24. The process of claim 23, further comprising depositing a light-diffusing coating on the curved light-reflecting surface.

25. The process of claim 23 wherein the shapes of the opposing curved edges are one of semi-circular, parabolic, hyperbolic, semi-elliptical or skewed parabolic.

26. The process of claim 23 wherein the pair of reflective surfaces are planar and are parallel to each other or substantially parallel to each other.

27. The process of claim 23, further comprising forming an imaging aperture in the curved reflector.

28. The process of claim 23 wherein the light module is a rectangular annulus.

29. The process of claim 28 wherein the one or more interior light sources are positioned only along two opposite edges of the rectangular annulus.

30. The process of claim 28 wherein the one or more exterior light sources are positioned along all four edges of the rectangular annulus.

31. The process of claim 23 wherein the light pipe is shaped like a rectangular annulus and comprises four segments.

32. The process of claim 31 wherein each segment of the light pipe tapers between a proximal end positioned near the exterior light sources and a distal tip spaced apart from the proximal end.

* * * * *